United States Patent [19]

Buchecker et al.

[11] Patent Number: 5,100,577
[45] Date of Patent: Mar. 31, 1992

[54] FERROELECTRIC LIQUID CRYSTAL MIXTURES AND COMPOUNDS AS WELL AS ELECTRO-OPTICAL DEVICES EMPLOYING SAME

[75] Inventors: Richard Buchecker, Zurich, Switzerland; Hans-Jürgen Fromm, Tokyo, Japan; Stephen Kelly, Möhlin, Switzerland; Martin Schadt, Seltisberg, Switzerland; Alois Villiger, Basle, Switzerland

[73] Assignee: Hoffman-La Roche Inc., Nutley, N.J.

[21] Appl. No.: 464,610

[22] Filed: Jan. 11, 1990

Related U.S. Application Data

[63] Continuation of Ser. No. 121,711, Nov. 17, 1987, abandoned.

[30] Foreign Application Priority Data

Nov. 28, 1986 [CH] Switzerland .......................... 4773/86
Sep. 23, 1987 [CH] Switzerland .......................... 3676/87

[51] Int. Cl.$^5$ ...................... C09K 19/52; C09K 19/34; C07D 319/06
[52] U.S. Cl. .................. 252/299.01; 252/299.61; 549/369; 549/371; 549/372; 549/374; 549/375; 359/103
[58] Field of Search ..................... 252/299.01, 299.61; 350/350 S; 549/371, 372, 374, 375, 369

[56] References Cited

U.S. PATENT DOCUMENTS

| 4,200,580 | 4/1980 | Hsu .................................. 252/299.61 |
| 4,313,878 | 2/1982 | Hsu .................................. 252/299.61 |
| 4,344,856 | 8/1982 | Demus et al. .................... 252/299.61 |
| 4,348,324 | 9/1982 | Demus et al. .................... 252/299.61 |
| 4,414,131 | 11/1983 | Sethofer et al. ................. 252/299.61 |
| 4,512,636 | 4/1985 | Andrews et al. ............... 252/299.61 |
| 4,521,327 | 6/1985 | Demus et al. .................... 252/299.61 |
| 4,621,901 | 11/1986 | Petrzilka et al. ................. 252/299.61 |
| 4,622,165 | 11/1986 | Kano et al. ....................... 252/299.01 |
| 4,676,604 | 6/1987 | Petrzilka ........................... 252/299.61 |
| 4,704,227 | 11/1987 | Krause et al. .................... 252/299.61 |
| 4,709,030 | 11/1987 | Petrzilka et al. ................. 252/299.61 |
| 4,753,752 | 6/1988 | Raynes et al. .................... 252/299.61 |
| 4,784,793 | 11/1988 | Coates et al. .................... 252/299.01 |

FOREIGN PATENT DOCUMENTS

| 87679 | 9/1983 | European Pat. Off. ........ 252/299.61 |
| 156726 | 10/1985 | European Pat. Off. ........ 252/299.01 |
| 168683 | 1/1986 | European Pat. Off. ........ 252/299.61 |
| 188222 | 7/1986 | European Pat. Off. ........ 252/299.65 |
| 247466 | 12/1987 | European Pat. Off. ........ 252/299.61 |
| 248335 | 12/1987 | European Pat. Off. ........ 252/299.61 |
| 3515373 | 11/1986 | Fed. Rep. of Germany .................... 252/299.61 |
| 3518734 | 11/1986 | Fed. Rep. of Germany .................... 252/299.61 |
| 3627964 | 3/1987 | Fed. Rep. of Germany .................... 252/299.61 |
| 61-87777 | 5/1986 | Japan ............................... 252/299.61 |
| 62-289574 | 12/1987 | Japan ............................... 252/299.61 |
| 86/02938 | 5/1982 | World Int. Prop. O. ...... 252/299.01 |
| 86/04060 | 7/1986 | World Int. Prop. O. ...... 252/299.61 |
| 86/04328 | 7/1986 | World Int. Prop. O. ...... 252/299.01 |
| 87/05012 | 8/1987 | World Int. Prop. O. ...... 252/299.01 |
| WO87/05018 | 8/1987 | World Int. Prop. O. . |

OTHER PUBLICATIONS

Phil. Trans. R. Soc. Lond. A 309 105 (1983).
J. Org. Chem. 49, 4947 (1984).
Macromolecules 17, 851 (1984).
Bull. Chem. Soc. Japan 52, 3125 (1979).
Bull. Chem. Soc. Japan 56, 3517 (1983).
Haramoto, Y. et al., Bull. Chem. Soc. Jpn., vol. 59, pp. 3877-3880 (1986).
Haramoto, Y. et al., Chem. Lett., vol. 5, pp. 755-758 (1987).
Haramoto, Y., Mol. Cryst. Liq. Cryst., Lett. Sect., vol. 5(4), pp. 117-122 (1988).

Primary Examiner—John S. Maples
Assistant Examiner—Shean C. Wu
Attorney, Agent, or Firm—George M. Gould; George W. Johnston; Stephen L. Malaska

[57] ABSTRACT

A ferroelectric liquid crystalline mixture containing at least one optically active compound of the general formula

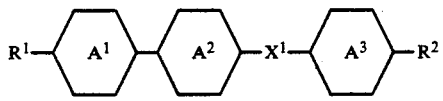

wherein $X^1$ denotes a single covalent bond, —COO—, —OOC—, —CH$_2$CH$_2$—, —OCH$_2$— or —CH$_2$O—; one of rings $A^1$, $A^2$ and $A^3$ represents trans-m-dioxan-2,5-diyl and the other two of rings $A^1$, $A^2$ and $A^3$ each independently represent unsubstituted 1,4-phenylene or 1,4-phenylene substituted with cyano, halogen or lower alkyl; $R^1$ and $R^2$ each independently signify an optionally halogen-substituted alkyl group with up to 18 carbon atoms in which optionally 1 CH$_2$ group or 2 non-adjacent CH$_2$ groups is/are replaced by —O—, —CO—, —COO— and/or —OOC—, as well as novel compounds falling under formula I and ferroelectric electrode-optical indicating devices including same.

11 Claims, No Drawings

FERROELECTRIC LIQUID CRYSTAL MIXTURES AND COMPOUNDS AS WELL AS ELECTRO-OPTICAL DEVICES EMPLOYING SAME

This application is a continuation of application Ser. No. 07/121,711, filed Nov. 17, 1987, now abandoned.

FIELD OF THE INVENTION

The present invention is concerned with novel liquid crystalline mixtures with ferroelectric properties, their use for electro-optical purposes and novel compounds for these mixtures.

BACKGROUND

Liquid crystals are used primarily as dielectrics in indicating devices, as the optical properties of such substances can be influenced by an applied voltage. Electro-optical devices based on liquid crystals are well-known to the person skilled in the art and can be based on various effects such as, for example, dynamic scattering, the deformation of aligned phases (DAP cells), the SchadtHelfrich effect (TN cells [twisted-nematic]and STN cells [super twisted-nematic]), the guest/host effect (guest/host cells), a cholesteric-nematic phase transition (phase-change cells) or the SBE effect (super birefringence effect). The response times of such indicating devices generally lie in the order of several milliseconds or more.

It has recently been found that the speed of response can be clearly improved by using indicating devices based on liquid crystals with ferroelectric properties. In this case there can basically be used various chiral smectic liquid crystals with ferroelectric properties such as, for example, liquid crystals with smectic C. F or I phases. However, liquid crystals with chiral smectic C phases have been found to be especially suitable.

Hitherto, comparatively few liquid crystals with ferroelectric properties have become known. Moreover, the known materials have mostly similar molecular structures and therefore permit only a limited variation of the properties of mixtures Further, the known liquid crystals frequently have an inadequate chemical and thermal stability or have only relatively narrow chiral smectic phases or chiral smectic phases which lie at high temperatures. There accordingly exists a great need for further suitable materials, especially having regard to the further improvement of ferroelectric liquid crystal mixtures.

SUMMARY OF THE INVENTION

The object of the present invention is a liquid crystalline mixture with ferroelectric properties containing at least 2 components, wherein at least one component is a compound of the formula

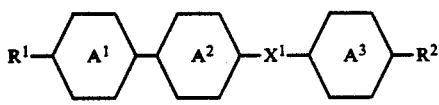

I wherein $X^1$ denotes a single covalent bond, —COO—. —OOC—, —$CH_2CH_2$—, —$OCH_2$— or —$CH_2O$—; one of rings $A^1$, $A^2$ and $A^3$ represents trans-m-dioxan-2,5-diyl and the other two of rings $A^1$, $A^2$ and $A^3$ each independently represent unsubstituted 1.4-phenylene or 1,4-phenylene substituted with cyano, halogen or lower alkyl; $R^1$ and $R^2$ each independently signify an optionally halogen-substituted alkyl group with up to 18 carbon atoms in which optionally one $CH_2$ group or two non-adjacent $CH_2$ groups is/are replaced by —O—, —CO—, —COO— and/or —OOC—.

A preferred aspect is concerned with the use of at least one optically active compound of formula I in which $R^1$ and/or $R^2$ has a chiral carbon atom in the above mixture. A further preferred aspect is concerned with the use of the above mixtures in ferroelectric electro-optical indicating devices. Such electro-optical indicating devices may include, for example, the liquid crystalline mixtures according to the invention sandwiched between two transparent plates having polarizers and electrode means.

DESCRIPTION OF THE PREFERRED EMBODIMENT

The compounds of formula I with long side-chains $R^1$ and/or $R^2$ generally have comparatively broad smectic C and/or smectic A phases and are therefore very well suited as components for ferroelectric mixtures, especially for mixtures with a chiral smectic C phase. The use of the compounds with smectic A phases facilitates, inter alia, a homogeneous orientation of the liquid crystal and can also broaden the ferroelectric range of the mixtures. The compounds of formula I with short side-chains $R^1$ and $R^2$ often have only monotropic or virtual phases, but are likewise suitable for improving the properties of ferroelectric mixtures and can displace the chiral smectic range to lower temperatures.

The compounds of formula I have a good chemical and thermal stability and a low viscosity. They have a good miscibility with one another and with known liquid crystals, especially with known ferroelectric liquid crystals.

The term "halogen" signifies in the scope of the present invention fluorine, chlorine, bromine or iodine. The term "lower alkyl" signifies alkyl groups with 1-5 carbon atoms such as methyl, ethyl propyl isopropyl and the like.

The term "aromatic ring" embraces substituted or unsubstituted 1,4-phenylene and pyrimidin-2,5-diyl. The term "saturated ring" embraces trans-m-dioxan-2,5-diyl and trans-1,4-cyclohexylene.

1,4-phenylene groups present in formula I are preferably unsubstituted. However, the transition temperatures, the solubility, the dielectric anisotropy and the like can be modified by using substituted 1,4-phenylene groups such as 2-methyl-1,4-phenylene. 2-fluoro-1,4-phenylene, 2-cyano-1,4-phenylene and 2,3-dicyano-1,4-phenylene.

A group —COO—, —OOC—, —$OCH_2$—or —$CH_2O$— which may be present as a value of $X^1$ is preferably attached to an aromatic ring with the oxygen atom. Where $X^2$ signifies the group —$CH_2CH_2$—, one of the rings $A^2$ and $A^3$ is preferably a saturated ring.

In general there are preferred those compounds of formula I in which one of rings $A^1$ and $A^2$ represents trans-m-dioxan-2,5-diyl, the other of rings $A^1$ and $A^2$ represents signifies an optionally substituted 1,4-phenylene ring and ring $A^3$ stands for optionally substituted 1,4-phenylene. Those compounds of formula I in which ring $A^1$ stands for trans-m-dioxan-2,5-diyl, ring $A^2$ stands for optionally substituted 1,4-phenylene and ring A stands for optionally substituted 1,4-phenylene are especially preferred. The dioxane ring is preferably linked in the 2-position with an optionally substituted 1,4-phenylene ring.

An especially preferred group of compounds of formula I comprises the compounds of the formula

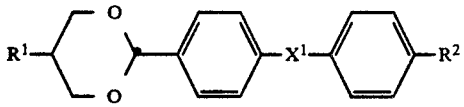
III wherein $X^1$ $R^1$ and $R^2$ have the above significances, especially those in which $R^1$ denotes a single covalent bond or —OOC—.

Those achiral compounds of formulae I and III in which $R^1$ and $R^2$ each individually signify achiral, preferably straight-chain, alkyl, alkoxy, alkanoyl, alkanoyloxy or alkoxycarbonyl and those chiral compounds of formulae I and III in which one of the residues $R^1$ and $R^2$ signifies chiral alkyl, alkoxy, alkanoyl, alkanoyloxy or alkoxycarbonyl and the other of the residues $R^1$ and $R^2$ signifies chiral or non-chiral, straight-chain or branched alkyl, alkoxy, alkanoyl, alkanoyloxy or alkoxycarbonyl are generally preferred and are readily accessible synthetically. The alkyl and alkoxy groups are especially preferred. In particular, in formulae I and III above preferably $R^1$ stands for alkyl stands for alkyl and $R^2$ stands for alkoxy. Further, $R^1$ and/or $R^2$ can preferably have one or more halogen substituents, i.e. chloroalkyl, chloroalkoxy, fluoroalkyl, fluoroalkoxy, chloroalkoxycarbonyl, fluoroalkoxycarbonyl, chloroalkanoyloxy, fluoroalkanoyloxy and the like.

Groups —O—, —CO—, —COO— and —OOC— which may be present in $R^1$ and/or $R^2$ must, however, not be directly attached to ring $A^1$ or $A^3$, but can also occur on another position in the chain. Examples of such groups are alkoxyalkyl, alkoxyalkoxy, alkoxyalkanoyloxy, alkoxyalkoxycarbonyl, alkanoyloxyalkyl, alkanoyloxyalkoxy and the like.

In the case of chiral compounds of formula I, preferably $R^1$ is a chiral residue and $R^2$ is a non-chiral residue or $R^1$ is a non-chiral residue and $R^2$ is a chiral residue. Further, the chiral residue is preferably attached to an aromatic ring.

Preferred residues $R^1$ and/or $R^2$ with chiral carbon atoms are the groups of the formula

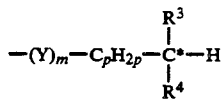
V wherein m stands for the number 0 or 1 and p stands for an integer of 0–6; $R^3$ signifies alkyl and $R^4$ signifies halogen, alkoxy or alkyl different from $R^3$; Y denotes the group —CH$_2$—, —O—, —CO—, —COO— or —OOC—; and C* signifies the chiral carbon atom.

Especially preferred chiral residues $R^1$ and/or $R^2$ are the groups of formula V in which $R^3$ signifies methyl and $R^4$ signifies alkyl different from methyl, for example ethyl, or $R^3$ signifies alkyl and $R^4$ signifies halogen. Preferably, Y in formula V stands for —CH$_2$—, —O— or —COO—, especially for —CH$_2$— or —O—.

Examples of especially preferred chiral residues are the chiral alkyl groups such as 2-methylbutyl, 2-methyl3-methylpentyl, 2-methylhexyl, 3-methylhexyl. -methylhexyl, 1-methylheptyl, 2-methylheptyl, 3- methyl4-methylheptyl, 5-methylheptyl, 6-methyloctyl. 4-methylnonyl and 8-methyldecyl; the chiral alkoxy groups such as 1-methylbutyloxy, 2-methylbutyloxy, 2-methyl3-methylpentyloxy. 4-methylhexyloxy, 1-methylheptyloxy, 5-methylheptyloxy, 6-methyloctyloxy, 7-methyloctyloxy and 8-methyldecyloxy; the chiral alkanoyl groups such as 3-methylpentanoyl, 4-methylhexanoyl, 5-methylheptanoyl and 6-methyloctanoyl; the chiral alkanoyloxy groups such as 3-methylpentanoyloxy, 4-methylhexanoyloxy, 5-methylheptanoyloxy and 6-methyloctanoyloxy; the chiral alkoxycarbonyl groups such as 1-methylbutyloxycarbonyl, 2-methylbutyloxycarbonyl, 3-methylpentyloxycarbonyl, 4-methylhexyloxycarbonyl, 1-methylheptyloxycarbonyl, 5-methylheptyloxycarbonyl and 6-methyloctyloxycarbonyl; the chiral halogenoalkoxy groups such as 2-chloroproxyloxy. 2-fluoropropyloxy, 2-chlorobutyloxy, 2-fluorobutyloxy. 2-chloropentyloxy, 2-fluoropentyloxy, 2-chlorohexy oxy, 2-fluorohexyloxy, 2-chlorooctyloxy and 2-fluorooctyloxy; the chiral halogenoalkoxycarbonyl groups such as 2-chloropropyloxycarbonyl, 2-fluoropropyloxycarbonyl, 2-chlorobutyloxycarbonyl, 2-chloropentyloxycarbonyl, 2-chlorohexyloxycarbonyl and 2-chloroheptyloxycarbonyl; and the chiral halogenoalkanoyloxy groups such as 2-chloropropanoyloxy, 2-fluoropropanoyloxy, 2-chlorobutanoyloxy, 2-fluorobutanoyloxy, 3-chlorobutanoyloxy, 3-fluorobutanoyloxy, 2-chloropentanoyloxy, 2-fluoropentanoyloxy, 3-chloropentanoyloxy, 3-fluoropentanoyloxy, 2-chlorohexanoyloxy, 2-fluorohexanoyloxy, 3-chlorohexanoyloxy, 3-fluorohexanoyloxy, 2-chloroheptanoyloxy, 2-fluoroheptanoyloxy, 3-chloroheptanoyloxy and 3-fluoroheptanoyloxy.

Examples of especially preferred non-chiral, straight-chain or branched residues are the alkyl groups such as pentyl, isopentyl, hexyl, isohexyl, heptyl, octyl, nonyl, decyl, undecyl and dodecyl; the alkoxy groups such as pentyloxy, isopentyloxy, hexyloxy, heptyloxy, octyloxy, nonyloxy, decyloxy, undecyloxy and dodecyloxy; the alkanoyl groups such as pentanoyl, hexanoyl, heptanoyl, octanoyl, nonanoyl, decanoyl, undecanoyl and dodecanoyl; the alkanoyloxy groups such as butanoyloxy, pentanoyloxy, hexanoyloxy, heptanoyloxy, octanoyloxy, nonanoyloxy and decanoyloxy; and the alkoxycarbonyl groups such as propyloxycarbonyl, isopropyloxycarbonyl, butyloxycarbonyl, pentyloxycarbonyl, hexyloxycarbonyl, heptyloxycarbonyl, octyloxycarbonyl, nonyloxycarbonyl and decyloxycarbonyl.

$R^1$ and $R^2$ conveniently have a maximum of in each case 18 carbon atoms, preferably about 4–15 and particularly about 5–12 carbon atoms. Further, the compounds of formulae I and III preferably have in $R^1$ and $R^2$ together at least 8, especially at least 10 and particularly at least 12 carbon atoms.

Those compounds of formula I above in which R and $R^2$ together have at least 8 carbon atoms and in which $R^1$ and/or $R^2$ has a chiral carbon atom and/or ring $A^1$ signifies trans-m-dioxan-2,5-diyl, rings $A^2$ and $A^3$ signify unsubstituted 1,4-phenylene or 1,4-phenylene substituted with cyano, halogen or lower alkyl, $X^1$ signifies a single covalent bond or —OOC—and R signifies alkoxy are novel and also form an object of the present invention. These compounds of formula I which have in $R^1$ and $R^2$ together at least 8, preferably at least 10 particularly at least 12, carbon atoms generally themselves have an enantiotropic smectic C and/or smectic A phase. Preferred compounds in accordance with the invention are the compounds in accordance with the preferred aspects referred to above which have the given number of carbon atoms in $R^1$ and $R^2$ together. Examples of preferred compounds in accordance with the inventions are the compounds named in the Synthesis Examples. The compounds of formula III above in which $X^1$ denotes a single covalent bond or —OOC—, $R^2$ signifies alkoxy and $R^1$ and $R^2$ together have at least 8 carbon atoms are especially preferred. $R^1$ in formula III preferably stands for alkyl.

The compounds of formula I with short residues $R^1$ and $R^2$ generally have no enantiotropic smectic C or smectic A phases, but are also suitable as components for ferroelectric mixtures.

The compounds of formula I can be obtained according to usual methods for the manufacture of dioxanes, for example according to the methods illustrated in the Synthesis Examples. Suitable compounds for the introduction of the chiral residues are for the most part known or can be obtained according to usual methods from known chiral compounds, e.g. amino acids, α-hydroxycarboxylic acids, β-hydroxycarboxylic acids and the like.

The manufacture of the liquid crystalline mixtures in accordance with the invention and their use in electrooptical devices can also be effected in a manner known per se.

The compounds of formula I can be mixed with one another and/or with suitable materials which are usual for ferroelectric mixtures. The mixtures in accordance with the invention can therefore contain one or more compounds of formula I and one or more further additives or can consist solely of two or more compounds of formula I. Conveniently, the mixture contains one or more compounds, which themselves have ferroelectric properties, in suitable amounts.

The liquid crystalline mixtures with ferroelectric properties in accordance with the invention can contain, besides one or more compounds of formula I, usual components for chiral smectic mixtures. They preferably contain one or more compounds from the group of the formulae

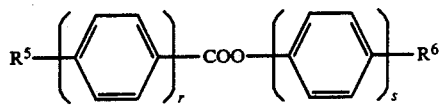

VII

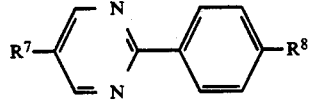

VIII

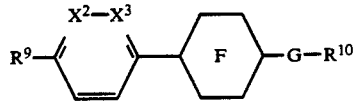

IX

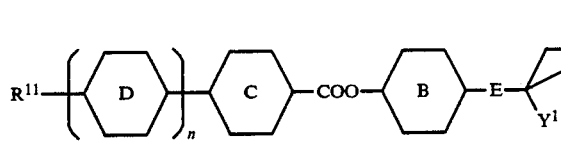

X

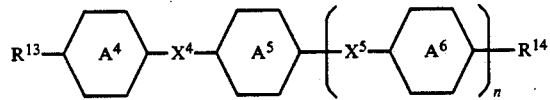

XI

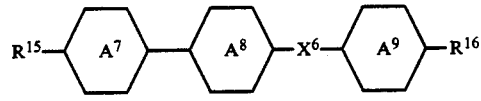

wherein $R^5$ and $R^6$ signify alkyl, alkoxy, alkanoyl, alkanoyloxy, alkoxycarbonyl or alkoxycarbonyloxy with up to 18 carbon atoms; r and s each independently signify 1 or 2; $R^7$ and $R^8$ represent alkyl or alkoxy with 1-18 carbon atoms; $X^2$ stands for CH and $X^3$ stands for N or $X^2$ stands for N and $X^3$ stands for CH; G signifies a single covalent bond, trans-1,4-cyclohexylene, cis-4-cyano-trans-1,4-cyclohexylene or -phenylene optionally substituted with halogen or methyl; ring F represents trans-1,4-cyclohexylene, 1,4-phenylene optionally substituted with halogen or methyl or, when G signifies a single covalent bond, also cis-4-cyano-trans-1,4-cyclohexylene; $R^9$ and $R^{10}$ each denote an optionally halogen-substituted alkyl or alkenyl group in which optionally one CH$_2$ group or two non-adjacent CH$_2$ groups is/are replaced by —O—, —COO—and/or —OOC—; n stands for the number 0 or 1; E signifies a single covalent bond. —CH$_2$—CH$_2$—, —OCH$_2$—, —COO— or —OOC—; rings B, C and D denote 1,4-phenylene optionally substituted with cyano, halogen or lower alkyl; $Y^1$ and $Y^2$ signify hydrogen or one of the substituents $Y^1$ and $Y^2$ also signifies cyano; $R^{11}$ and $R^{12}$ each independently represent optionally halogen-substituted C$_1$-C$_{18}$-alkyl or optionally halogen-substituted C$_2$-C$_{18}$-alkenyl in which optionally one CH$_2$ group or two non-adjacent CH$_2$ groups is/are replaced by oxygen; $X^4$ represents a single covalent bond, —COO— or —OOC— and X represents a single covalent bond, —COO—, —OOC—, —CH$_2$CH$_2$—, —OCH$_2$—or —CH$_2$O—; rings A$^4$, A$^5$ and A$^6$ each independently signify unsubstituted 1,4-phenylene or 1,4-phenylene substituted with cyano, halogen or lower alkyl or one of the rings also signifies pyrimidin-2,5-diyl or pyrazin-2,5-diyl and/or, when n stands for the number 1, one of the rings also signifies trans-1,4-cyclohexylene or trans-m-dioxan-2,5-diyl; R$^{13}$ signifies an optionally halogen-substituted alkenyl group with up to 18 carbon atoms in which optionally 1 CH$_2$ group or 2 nonadjacent CH$_2$ groups is/are replaced by —O—, —CO—, —COO— or —OOC— and/or optionally a C—C single bond is replaced by a C=C double bond; R$^{14}$ signifies an optionally halogen-substituted alkyl group with up to 18 carbon atoms in which optionally 1 CH$_2$ group or 2 nonadjacent CH$_2$ groups is/are replaced by —O—, —CO—, —COO— or —OOC— and/or optionally a C—C single bond is replaced by a C—C double bond; X$^6$ denotes a single covalent bond, —COO—, —OOC—, —CH$_2$CH$_2$—, —OCH$_2$—or —CH$_2$O—; one of rings A$^7$, A$^8$ an A$^9$ represents pyrimidin-2,5-diyl, one of rings A$^7$, A$^8$ and A$^9$ represents unsubstituted 1,4-phenylene or 1,4-phenylene substituted with cyano, halogen or lower alkyl and one of rings A$^7$, A$^8$ and A$^9$ represents trans-1,4-cyclohexylene or unsubstituted 1,4-phenylene or 1,4-phenylene substituted with cyano, halogen or lower alkyl; and R$^{15}$ and R$^{16}$ each independently signify an optionally halogen-substituted alkyl group with up to 18 carbon atoms in which optionally 1 CH$_2$ group or 2 non-adjacent CH$_2$ groups is/are replaced by —O—, —CO—, —COO— and/or —OOC—.

The ferroelectric mixtures in accordance with the invention can basically consist of optically inactive compounds. However, they preferably contain one or more optically active compounds in order to produce a spontaneous polarization. i.e. they preferably contain at least one optically active compound of formula I with a chiral carbon atom in R$^1$ and/or R$^2$ and/or at least one optically active additive. Preferred chiral smectic mixtures with at least two components are accordingly those in which at least one component is an optically active compound of formula I and a second component can be optically active or optically inactive, as well as those in which at least one component is an optically inactive, preferably achiral, compound of formula I and a second component is optically active. The second component is preferably a further compound of formula I or a compound of formulae VI-XI.

Especially suitable additives for producing a high spontaneous polarization are the optically active compounds of the formula

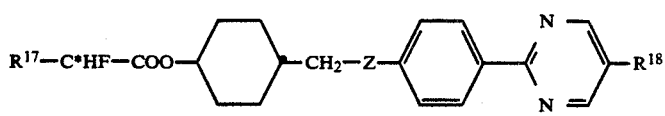

XII wherein C* denotes a chiral carbon atom, Z represents a methylene group or an oxygen atom and R$^{17}$ and R$^{18}$ each independently signify alkyl.

The compounds of formula XII are novel and are also a object of the present invention. They can be prepared according to the method illustrated in the Synthesis Examples. R$^{17}$ and R$^{18}$ conveniently stand for C$_1$-C$_{18}$-alkyl, preferably for C$_5$-C$_{12}$-alkyl.

The amount of compounds of formula I in the mixtures in accordance with the invention can vary in wide limits and can be, for example, about 1-100 wt %. In general, however, an amount of about 10-60 wt. % of compounds of formula I is preferred.

The invention is illustrated in more detail by the following Examples. Unless otherwise indicated, the following examples were carried out as written. As used herein, the term "room temperature" shall mean about 22° C. The enantiomers of the given compounds each have the same phase transition temperatures and the same twisting, but of opposite signs. The abbreviations used for the characterization of the phase transitions have the following significances:

C stands for crystalline
S stands for smectic
S$_A$ stands for smectic A
S$_B$ stands for smectic B
S$_C$ stands for smectic C
S$_C$* stands for chiral smectic C
Ch stands for cholesteric
N stands for nematic
I stands for isotropic.

EXAMPLE 1

(a) A suspension of 21.06 g of 4-biphenylyl p-toluenesulphonate in 120 ml of dichloromethane was treated at −2° C. while stirring with 23.6 ml of titanium tetrachloride. The mixture was treated dropwise at the same temperature within 30 minutes with 9.63 ml of dichloromethyl methyl ether, stirred at room temperature for a further 1 hour and then poured on to ice. The aqueous phase was separated and extracted with dichloromethane. The combined organic phases were washed with saturated sodium hydrogen carbonate solution and then with water, dried over sodium sulphate and concentrated. Recrystallization of the crude product obtained from 50 ml of ethyl acetate gave 11.65 g of 4'-(p-toluenesulphonyloxy)biphenyl-4-carboxaldehyde.

(b) A solution of 2.82 g of 4'-(p-toluenesulphonyloxy)biphenyl-4-carboxaldehyde and 1.54 g of 2-hexyl-1,3-propane-diol in 50 ml of toluene was treated with 3 drops of 10% (vol.) sulphuric acid. The mixture was heated to boiling for 1.5 hours, with about 50 ml of damp toluene being distilled off and 30 ml of fresh toluene being simultaneously added dropwise. Then, 10 drops of triethylamine were added to the reaction mixture. After cooling the mixture was washed with 10 ml of 1N sodium hydrogen carbonate solution and three times with 20 ml of water each time, dried over sodium sulphate and concentrated. The resulting crude 5-hexyl-2-[4'-(p-toluenesulphonyloxy)-4-biphenylyl]m-dioxane (4.26 g) was dissolved in 160 ml ethanol. The solution was treated with a solution of 2.64 g of potassium hydroxide in 27 ml of water and heated to boiling for 1.8 hours while stirring. After cooling the reaction mixture was neutralized (to pH 6) with 1.9 ml of glacial acetic acid and concentrated to about 20 ml. The suspension obtained was diluted with 80 ml of dichloromethane and the organic phase was washed twice with 20 ml of water each time, dried over sodium sulphate and concentrated. Chromatography of the residue (2.80 g) on g of silica gel with toluene/acetone (vol. 19:1) gave 1.94 g of 5-hexyl-2-(4'-hydroxy-4-biphenylyl)-m-dioxane.

(c) A solution of 1.36 g of 5-hexyl-2-(4'-hydroxy-4-biphenylyl)-m-dioxane and 1.43 g of (S)-1-brom hexane in 32 ml of N,N-dimethylformamide was treated with 1.38 g of finely powdered potassium carbonate and the mixture was stirred at 58° C. overnight. The suspension was suction filtered and the filtrate was concentrated in a vacuum. A solution of the residue in 40 ml of diethyl ether was washed twice with 15 ml of water each time, dried over sodium sulphate and concentrated. Chromatography of the crude product on 30 g of silica gel with hexane/ethyl acetate (vol. 24:1) gave 1.58 g of solid (S)-5-hexyl-2-[4'-(4-methylhexyloxy) -4-biphenylyl]-m-dioxane as a cis/trans mixture. Two-fold recrystalliation from ethyl acetate at −20° C. gave the pure trans compound; m.p. C-S) 58.6° C. phase transition (S-S$_C$*) 120.8° C., and (S$_C$* =-Ch) 140.2° C., cl.p. (Ch-I) 157° C.

The following compounds were manufactured in an analogous manner:

(S)-trans-5-pentyl-2-[4'-(4-methylhexyloxy)-4-biphenylyl]-m-dioxane, m.p. (C-S) about 85° C. (S-S) 95° C. (S-S$_C$*) 130.5° C. and (S$_C$*-Ch) 135.5° C., cl.p. (Ch-I) 161° C.;

(S)-trans-5-heptyl-2-[4'-(4-methylhexyloxy)-4-biphenylyl]-m-dioxane, m.p. C-S) 65.8° C., phase transitions (S-S*) 100° C., (S-S$_C$*) 117.3° C. and (S$_C$*-Ch) 147° C. cl.p (Ch-I) 159° C.;

(S)-trans-5-nonyl-2-[4'-(4-methylhexyloxy)-4-b[phenylyl]-m-dioxane. m.p. (C-S) 35.2° C., 51.6° C., (S-S$_C$*) 136.5° C., S$_C$*-S$_A$) 152° C. and (S$_A$-Ch) 152.5° C., cl.p. (Ch-I) 155.5° C.;

(S)-trans-5-nonyl-2-[4'-(2-methylbutyloxy)-4-biphenylyl]-m-dioxane, m.p. (C-S) 60.5° C., phas (S-S$_A$) 142.2° C. cl.p. (S$_A$-I) 147.5° C.;

trans-5-heptyl-2-(4'-heptyloxy-4-biphenylyl)-m-dioxane. m.p. (C-S) 66.5° C. phase transitions (S-S) 93° C., (S-S$_C$) 122° C., (S$_C$-N) 153° C., cl.p. (N-I) 173° C.; trans-5-hexyl-2-(4'-octyloxy-4-biphenylyl)-m-dioxane, m.p. (C-S) 72.5° C., phase transitions (S-S) 108.2° C. (S-S$_C$) 123° C., (SC-N) 146.5° C., cl.p. (N-I) 168° C.;

trans-5-heptyl-2-(4'-octyloxy-4-biphenylyl)-m-dioxane, m.p. (C-S) 65.5° C., phase transitions (S-S) 96.7° C., (S-S$_C$) 123° C. (S$_C$-N) 155° C., cl.p. (N-I) 170.2° C.;

trans-5-nonyl-2-(4'-octyloxy-4-biphenylyl)-m-dioxane. m.p. (C-S) 65.8° C., phase transitions (S-S) 142° C., (S-N) 63° C., cl.p. (N-I) 168.5° C.

The following compounds could be manufactured in an analogous manner:

(S)-trans-5-pentyl-2-[4'-(6-methyloctyloxy)-4-biphenylyl]-m-dioxane;

(S)-trans-5-hexyl-2-[4'-(6-methyloctyloxy)-4-biphenylyl]-m-dioxane;

(S)-trans-5-heptyl-2-[4'-(6-methyloctyloxy)-4-biphenylyl]-m-dioxane;

(S)-trans-5-octyl-2-[4'-(6-methyloctyloxy)-4-biphenylyl]-m-dioxane;

(S)-trans-5-nonyl-2-[4'-(6-methyloctyloxy)-4-biphenylyl]-m-dioxane;

(S)-trans-5-(3-methylpentyl)-2-(4'-decyloxy-4-biphenylyl]-m-dioxane.

EXAMPLE 2

(a) 3.7 g of N,N'-dicyclohexylcarbodiimide were added portionwise at 0° C. while stirring to a solution of 3.4 g of (S)-p-(4-methylhexyloxy)benzoic acid, 1.76 g of p-hydroxybenzaldehyde and 0.15 g of 4-(dimethylamino)-pyridine in 100 ml of dichloromethane. The mixture was stirred at 0° C. for a further 1 hour and at room temperature for 2 hours, then filtered and the filtrate was washed with 2N sodium carbonate solution and then with water, dried over sodium sulphate and concentrated. Chromatography of the residue on 120 g of silica gel with hexane/ethyl acetate (vol. 9:1) gave 4.2 g of pure (S)-p-(4-methylhexyloxy)benzoic acid p-formylphenyl ester.

(b) A solution of 0.8 g of 2-decyl-1,3-propanediol and 1.0 g of (S)-p-(methylhexyloxy)benzoic acid p-formylphenyl ester in 30 ml of toluene was heated to boiling for 2.5 hours with 2 drops of 10% (vol.) sulfuric acid, with damp toluene being distilled off and being replaced by the dropwise addition of fresh toluene. After the addition of 4 drops of triethylamine the mixture was left to cool and was then washed with sodium hydrogen carbonate solution and three times with water, dried over sodium sulphate and concentrated. The residue was chromatographed on 50 g of recrystallization of the fractions with a high trans con-p-(trans-5-decyl-m-dioxan-2-yl)phenyl ester; m.p. (C-S$_C$*) 66.5° C., phase transitions (S-S$_C$*) 35° C. and (S$_C$*-Ch) 97.5° C., cl.p. (Ch-I) 140.5° C.

The following compounds were manufactured in an analogous manner;

(S)-p-(2-Methylbutyloxy)benzoic acid p-(trans-5-nonyl-m-dioxan-2-yl)phenyl ester, m.p. (C-Ch) 70.5° C., phase transition (S-Ch) 49.5° C., cl.p. (Ch-I) 134.5° C.;

(S)-p-(2-methylbutyloxy)benzoic acid p-(trans-5-decyl-m-dioxan-2-yl)phenyl ester, m.p. (C-Ch) 77.3° C., phase transitions (S-S$_C$*) 54.3° C. and (S$_C$*-Ch) 60.3° C., cl.p. (Ch-I) 129.5° C.;

(S)-p-(4-methylhexyloxy)benzoic acid p-(trans-5-heptyl-m-dioxan-2-yl)phenyl ester, m.p. (C-Ch) 88.5° C., phase transitions (S-S$_C$*) 79.7° C. and (S$_C$*-Ch) 86.2° C., cl.p. (Ch-I) 150° C.;

(S)-p-(4-methylhexyloxy)benzoic acid p-(trans-5-nonyl-m-idoxan-2-yl)phenyl ester, m.p. (C-S$_C$*) 66.2° C., phase transitions (S-S$_C$*) 53.8° C. and (S$_C$*-Ch) 94° C., cl.p. (Ch-I) 144.5° C.;

(S)-p-(6-methyloctyloxy)benzoic acid p-(trans-5-heptyl-m-dioxan-2-yl)phenyl ester, m.p. (C-S$_C$*) 94.5° C., phase transition (S$_C$*-Ch) 102.7° C., cl.p. (Ch-I) 148° C.;

(S)-p-(6methyloctyloxy)benzoic acid p-(trans-5-nonyl-m-dioxan-2-yl)phenyl ester, m.p. (C-S$_C$*) 79° C., phase transitions (S-S$_C$*) 59° C. and (S$_C$*-Ch) 113° C., cl.p. (Ch-I) 144° C.;

(S)-p-(6-methyloctyloxy)benzoic acid p-(trans-5decyl-m-dioxan-2-yl)phenyl ester, m.p. (C-S$_C$*) 69° C., phase transitions (S-S$_C$*) 48.5° C. and (S$_C$*-Ch) 116° C., cl.p. (Ch-I) 141° C.;

p-hexyloxybenzoic acid p-(trans-5-decyl-m-dioxan-2-yl)phenyl ester, m.p. (C-S$_C$) 77.7° C., phase transitions (S-S$_C$) 44.2° C., (S$_C$-N) 89.7° C., cl.p. (N-I) 158° C.;

p-octyloxybenzoic acid p-(trans-5-heptyl-m-dioxan-2-yl)phenyl ester, m.p. (C-S$_C$) 89.5° C., phase transitions (S-S$_C$) 64° C., (S$_C$-N) 90.5° C., cl.p. (N-I) 154.5° C.;

p-octyloxybenzoic acid p-(trans-5-decyl-m-dioxan-2-yl)phenylester, m.p. (C-S$_C$) 65° C., phase transitions (S-S$_C$) 51.5° C., (S$_C$-N) 111° C., cl.p. (N-I) 163° C.

The following compounds could be manufactured in an analogous manner;

(S)-p-(2-methylbutyloxy)benzoic acid p-(trans-5-undecyl-m-dioxan-2-yl)phenyl ester;

(S)-p-(4-methylhexyloxy)benzoic acid p-(trans-5-octyl-m-dioxan-2-yl)phenyl ester;

(S)-p-(4-methylhexyloxy)benzoic acid p-(trans-5-undecyl-m-dioxan-2-yl)pheny, ester;

(S)-p-(6-methyloctyloxy)benzoic acid p-(trans-5-octyl-m-dioxan-2-yl)phenyl ester;

(S)-p-(6-methyloctyloxy)benzoic acid p-trans-5-undecyl-m-dioxan-2-yl)phenyl ester;

(S)-p-decyloxybenzoic acid p-(trans-5-[3-methyl-pentyl]-m-dioxan-2-yl)phenyl ester.

EXAMPLE 3

(a) 15.5 g of N,N'-diclyclohexylcarbodiimide were added portionwise while stirring to a solution of 9.0 g of p-carboxybenzaldehyde, 10.8 g of (S)-p-(2-methylbutyloxy)-phenol and 0.7 g of 4-(dimethylamino)pyridine in 150 ml of N,N-dimethylformade. The mixture was stirred overnight and then filtered. The filtrate was concentrated in a vacuum and the residue was taken up in dichloromethane. Washing of the organic phase with saturated sodium hydrogen carbonate solution and with water, drying over sodium sulphate, concentration and chromatography of the residue on 360 g of silica gel with toluene and toluene/dichloromethane (vol. 9:1) gave, in addition to mixed fractions, 5.8 g of pure (S)-p-formylbenzoic acid p-(2-methylbutyloxy)phenyl ester.

(b) A solution of 0.6 g of 2-nonyl-1,3-propanediol and 0.8 g of (S)-p-formylbenzoic acid p-(2-methylbutyloxy)-phenyl ester in 25 ml of toluene was heated to boiling for 1.5 hours with 2 drops of 10 % (vol.) sulphuric acid, with damp toluene being distilled off and being replaced by the dropwise addition of fresh toluene. After the addition of 4 drops of triethylamine the mixture was left to cool and was washed with sodium hydrogen carbonate solution and three times with water, dried over sodium sulphate and concentrated. Chromatogrpahy of the residue on 40 g of silica gel with hexane/ethyl acetate (vol. 23:2) and repeated recrystallization from ethyl acetate gave 0.6 g of pure (S)-p-(trans-5-nonyl-m-idoxan-2-yl)benzoic acid p-(2-methylbutyloxy)phenyl ester; m.p. (C-S) 65° C., phase transition (S-$S_A$) 102.8° C., cl.p. ($S_A$-I) 141.8° C.

The following compounds were manufactured in an analogous manner:

(S)-p-(trans-5-Heptyl-m-dioxan-2-yl)benzoic acid p-(2-methylbutyloxy)phenyl ester, m.p. (C-S) 75° C., phase transitions (S-$S_A$) 96.5° C. and ($S_A$-Ch) 138° C., cl.p. (Ch-I) 142° C.;

(S)-p-(trans-5-nonyl-m-dioxan-2-yl)benzoic acid p-(6-methyloctyloxy)phenyl ester; m.p. (C-S) 44° C., phase transitions (S-$S_A$) 111° C. and ($S_A$-Ch) 148° C., cl.p. (Ch-I) 149.5° C;

The following compounds could be manufactured in an analogous manner;

(S)-p-(trans-5-decyl-m-dioxan-2-yl)benzoic acid p-(2-methylbutyloxy)phenyl ester;

(S)-p-(trans-5-decyl-m-dioxan-2-yl)benzoic acid p-(6-methyloctyloxy)phenyl ester;

(S)-p-(trans-5-[3-methylpentyl]-m-dioxan-2-yl)benzoic acid p-decyloxyphenyl ester.

EXAMPLE 4

0.62 g of trans-4-[(p-(5-decyl-2-pyrimidinyl)phenoxymethyl]cyclohexanol, 0.196 g of (S)-2-fluorocaproic acid, 0.413 g of dicyclohexylcarbodiimide and 0.025 g of 4-(dimethylamino)pydidine were dissolved in 25 ml of methylene chloride and stirred at room temperature for 15 hours. The white suspension was subsequently filtered. The residue obtained after evaporation of the solvent from the filtrate was purified by chromatography on silica gel with ethyl acetate/petroleum ether (vol. 1:9). Subsequent crystallization from 10 ml of ethyl acetate and 50 ml of hexane gave 0.62 g of trans-4-[(p-(5-decyl-2-pyrimidinyl)phenoxy)methyl]cyclohexyl (S)-2-fluorohexanoate as colourless crystals, m.p. (C-S) 88.5° C., phase transitions (S-$S_C$) 108.8° C., ($S_C$-$S_A$) 128° C., cl.p. ($S_A$-I) 137.7° C.

The following compounds could be manufactured in an analogous manner.

trans-4-[(p-(5-Nonyl-2-pyrimidinyl)phenoxy)methyl]-cyclohexyl-(S)-2-fluorohexanoate;

trans-4-[(p-(5-nonyl-2-pyrimidinyl)phenoxy)methyl]-cyclohexyl-(S)-2-fluoroheptanoate;

trans-4-[(p-(5-octyl-2-pyrimidinyl)phenoxy)methyl)-cyclohexyl-(S)-2-fluorooctanoate;

trans-4-[2-(p-(5-decyl-2-pyrimidinyl)phenyl)ethyl]cyclohexyl-(S)-2-fluorohexanoate;

trans-4-[2-(p-(5-nonyl-2-pyrimidinyl)phenyl)ethyl]-cyclohexyl-(S)-2-fluoroheptanoate;

trans-4-[2-(p-octyl-2-pyrimidinyl)phenyl)ethyl]cyclohexyl-(S)-2-fluorooctanoate.

We claim:

1. A liquid crystalline mixture with ferroelectric properties containing at least two components, wherein at least one component is an optically active compound of the formula

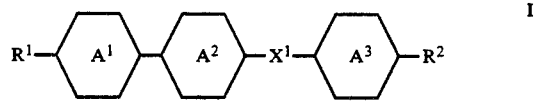

wherein $X^1$ notes a single covalent bond, —COO—, —OOC—, —CH$_2$CH$_2$—, —OCH$_2$—or —CH$_2$O—; ring $A^1$ represents trans-m-dioxane-2,5-diyl and the other two of rings $A^2$ and $A^3$ each independently represent unsubstituted 1,4-phenylene or 1,4-phenylene substituted with cyano, halogen or lower alkyl; $R^1$ and $R^2$ each independently signify an optionally halogen-substituted alkyl group with up to 18 carbon atoms in which optionally one CH$_2$ group or two non-adjacent CH$_2$ groups is/are replaced by —O—, —CO—, —COO—and/or —OOC—in which $R^1$ and/or $R^2$ has a chiral carbon atom.

2. A liquid crystalline mixture according to claim 1, which contains one or more compounds of the formula

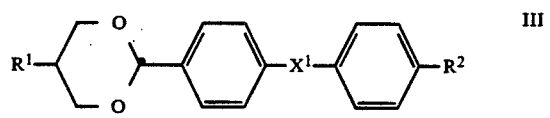

3. A liquid crystalline mixture according to claim 2, wherein $X^1$ denotes a single covalent bond or —OOC—.

4. A liquid crystalline mixture according to claim 1, which contains at least one optically active compound of formula I and wherein the residue $R^1$ and/or $R^2$ having a chiral carbon atom is a group of the formula

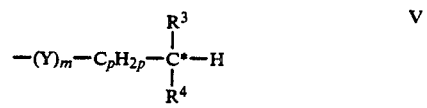

wherein m stands for the number 0 or 1 and p stands for an integer of 0-6; $R^3$ signifies alkyl and $R^4$ signifies halogen, alkoxy or alkyl different from $R^3$; Y denotes the group —$CH_2$—, —O—, —CO—, —COO— or —OOC—; and C* signifies the chiral carbon atom.

5. A liquid crystalline mixture according to claim 4, wherein $R^3$ signifies methyl and $R^4$ signifies alkyl other than methyl.

6. A liquid crystalline mixture according to claim 4, wherein $R^3$ signifies alkyl and $R^4$ signifies halogen.

7. A liquid crystalline mixture according to claim 1, wherein one of the residues $R^1$ and $R^2$ signifies chiral, optionally halogen-substituted alkyl, alkoxy, alkanoyl, alkanoyloxy or alkoxycarbonyl and the other of the residues $R^1$ and $R^2$ signifies chiral or non-chiral, optionally halogen-substituted alkyl, alkoxy, alkanoyl, alkanoyloxy or alkoxycarbonyl.

8. A liquid crystalline mixture according to claim 1, wherein $R^1$ signifies alkyl and $R^2$ signifies alkoxy.

9. A liquid crystalline mixture according to claim 1, wherein $R^1$ and $R^2$ each independently have 4 to 15, carbon atoms.

10. A liquid crystalline mixture according to claim 1, wherein $R^1$ and $R^2$ each independently have 5 to 12, carbon atoms.

11. In an ferroelectric electro-optical indicating device of the type having a liquid crystal mixture sandwiched between two transparent plates having polarizers and electrode means, wherein the improvement comprises:

said liquid crystalline mixture containing at least two components wherein at least one component is a optically active compound of the formula

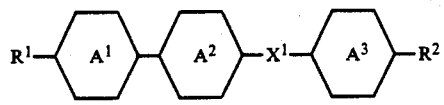

wherein $X^1$ denotes a single covalent bond, —COO—, —OOC—, —$CH_2CH_2$—, —$OCH_2$— or —$CH_2O$—; ring $A^1$ represents trans-m-dioxan-2,5-diyl and the other two of rings and $A^3$ each independently represent unsubstituted 1,4-phenylene or 1,4-phenylene substituted with cyano, halogen or lower alkyl; $R^1$ and $R^2$ each independently signify an optionally halogen-substituted alkyl group with up to 18 carbon atoms in which optionally one $CH_2$ group of two non-adjacent $CH_2$ groups is/or replaced by —O—, —CO—, —COO— and/or —OOC— in which $R^1$ and/or $R^2$ has a chiral carbon atom.

* * * * *

UNITED STATES PATENT AND TRADEMARK OFFICE
CERTIFICATE OF CORRECTION

PATENT NO. : 5,100,577
DATED : March 31, 1992
INVENTOR(S) : Richard Buchecker, Hans-Jurgen Fromm, Stephen Kelly, Martin Schadt and Alois Villiger It is certified that error appears in the above-identified patent and that said Letters Patent is hereby corrected as shown below:

In claim 1, column 12, line 34, delete "notes" and insert --therefor -- denotes --;

In claim 1, column 12, line 36, delete "trans-m-dioxane-2,5-diyl" and insert therefor -- trans-m-dioxan-2,5-diyl --;

In claim 11, column 14, line 17, between the words "rings" and "and", please insert -- $A^2$ --;

In claim 11, column 14, line 23, delete "of" and insert therefor -- or --;

In claim 11, column 14, line 24, delete "is/or" and insert therefor -- is/are --.

Signed and Sealed this

Fifteenth Day of June, 1993

Attest:

MICHAEL K. KIRK

Attesting Officer     Acting Commissioner of Patents and Trademarks